United States Patent [19]

Downton

[11] Patent Number: 4,993,274
[45] Date of Patent: Feb. 19, 1991

[54] GYROSCOPE SYSTEM

[75] Inventor: Geoffrey Downton, Bracknell, England

[73] Assignee: British Aerospace PLC, London, England

[21] Appl. No.: 305,760

[22] Filed: Feb. 3, 1989

[30] Foreign Application Priority Data

Feb. 10, 1988 [GB] United Kingdom ............... 8803063

[51] Int. Cl.$^5$ .................... G01C 19/28; G01C 19/30
[52] U.S. Cl. ................................ 74/5.46; 74/5.6 E
[58] Field of Search ............... 74/5.34, 5.46, 5.6 E, 74/5.41

[56] References Cited

U.S. PATENT DOCUMENTS

| | | | |
|---|---|---|---|
| 3,258,977 | 7/1966 | Hoffman | 74/5.34 |
| 3,477,298 | 11/1969 | Howe | 74/5.34 |
| 3,587,330 | 6/1971 | Deer | 74/5.6 |
| 3,979,090 | 9/1976 | Brickner et al. | 74/5.34 X |
| 4,292,854 | 10/1981 | Liebing | 74/5.34 |
| 4,823,626 | 4/1989 | Hartmann et al. | 74/5.34 |

Primary Examiner—Rodney H. Bonck
Attorney, Agent, or Firm—Nixon & Vanderhye

[57] ABSTRACT

A gyroscope system comprises a dual-axis rate gyroscope (1) including angle pick-offs and rotor torque applying device (5), and a control circuit (3) arranged to supply a control signal to the rotor torque applying device (5) in accordance with the output angle sensed by the angle pick-offs. The system further comprises an angular acceleration sensor (2) which is independent of the dual-axis rate gyroscope and is arranged to output a signal to the control circuit (3). The signal modifies in accordance with the sensed angular acceleration the control signal supplied to the torque applying device (5). Preferably the angular acceleration sensor (2) forms part of a guidance system independent of the dual-axis rate gyroscope (1).

4 Claims, 2 Drawing Sheets

TO TORQUE COILS

GYROSCOPE SYSTEM

BACKGROUND OF THE INVENTION

The present invention relates to rate gyroscopes such as those used in aircraft and missile guidance systems. An example of such a gyroscope is disclosed in the applicant's earlier British Pat. No. 2079954B. In this dual axis rate gyroscope a rotor is mounted so as to be free to tilt about two mutually perpendicular axes in a plane normal to its axis of rotation. Such a rate gyroscope has the characteristic feature that a torque is applied to the rotor to precess it in the direction in which the aircraft or missile is turning. Fixed coils positioned towards the periphery of the rotor act as angle pick-offs sensing the tilt of the rotor. The coils also provide a torque to counter the tilting under the control of a servo system driven by the outputs of the angle pick-off. The dynamics of the system are such that the applied torque along one axis is proportional to the angular rate applied about the other axis.

In practice the performance of gyroscopes of this type is limited by various factors. The angle pick-offs are linear over a finite range only and so limit the effective dynamic range of the system in situations where the applied angular accelerations are high. The design of the control loop is compromised by the need to suppress rotor torque noise at rotor-speed frequencies, the need to provide nutation control and to ensure a stable control loop. Such limitations combine significantly to restrict the rate measurement bandwidth of conventional dual-axis rate gyroscopes.

It is known to use linear accelerometers in displacement gyroscope systems. Once such system is disclosed in U.S. patent application Ser. No. 3,587,330. In such displacement gyroscopes torques are applied to their rotors to maintain them absolutely vertical with respect to the earth's gravitational field. The value of the angle between the gyroscope and its base plate are then read off by angle pick-offs to provide the output signal. The accelerometers are used simply to provide the long term stability of the gyroscope by sensing the deviation from the vertical and torquing the gyroscope accordingly. In a rate gyroscope by contrast, far from being maintained at the vertical the rotor of the gyroscope is torqued each time the vehicle moves so that it precesses in the direction in which the vehicle is turning. The dynamics of such a rate gyroscope system are therefore entirely different from the displacement gyroscopes known in the art.

SUMMARY OF THE INVENTION

According to a first aspect of the present invention a gyroscope system comprising a dual-axis rate gyroscope including angle pick-off means and rotor torque applying means, and control means arranged to supply a control signal to the rotor torque applying means in accordance with the output angle sensed by the angle pick-off means is characterised in that the system further comprises angular acceleration sensing means independent of the dual-axis rate gyroscope arranged to output a signal to the control means to modify in accordance with the sensed angular acceleration the control signal supplied to the torque applying means.

According to a second aspect a method of operating a dual-axis rate gyroscope system mounted on a moving platform and including a rotor, angle-pick-off means, and rotor torque applying means comprises:

- detecting with the angle-pick-off means the angular displacement of the rotor with respect to the platform and generating a first control signal dependent on the sensed displacement;
- detecting the angular acceleration of the platform and generating independently of the first control signal a second control signal dependent on the sensed angular acceleration;
- modifying the first signal in accordance with the second signal to generate a torque signal; and,
- outputting the torque signal to the rotor torque applying means to torque the rotor by precessing the rotor in the direction of movement of the platform.

The present invention by providing an additional control loop for the rate gyroscope system which is independent of the gyroscope itself removes many of the constraints on the design of the primary control loop and enables the rate gyroscope system as a whole to provide a significantly enhanced performance. In particular the present invention allows a reduction in the gyro-wheel speed with, as a consequence, a greatly increased angular slew-rate measurement capability. Conventional gyro loop designs are such that for a given wheel speed the loop bandwidth cannot be increased beyond a certain point. In order to further increase loop bandwidth the wheel speed has to be increased as well. However, increasing wheel speed reduces the gyro's maximum slew rate capability. This invention, by using external angular acceleration information decouples this constraining relationship between loop bandwidth and wheel speed. The reduced wheel speed then possible leads to a reduction in wheel speed noise. The present invention enables the bandwidth of the composite system to be extended to the fundamental limits imposed by the bandwidth of the angle pick-offs and the bandwidth of the angular acceleration sensor. With suitable scaling of the angular acceleration signals the steady-state hang-off of the gyro-rotor with respect to its angle pick-off can be designed to be zero for constant angular rate or constant angular acceleration inputs. As a result the gyro's ability to measure severe angular rate transients without the rotor hang-off becoming excessive is significantly enhanced.

Since additional control is provided by the secondary loop from the angular acceleration sensor the primary control loop including the gyroscope can be designed to have a narrow bandwidth without there being any significant reduction in the gyro's inherent error drift. As a result of the reduced bandwidth, wheel speed noise harmonics within the gyro loop are greatly attenuated. This reduces the incidence of rate measurement errors engendered by torques applied to the wheel at multiples of the wheel frequency. The provision of angular acceleration information can also be arranged to cancel those errors in the rate measurements which are a function of applied angular acceleration.

The independent angular acceleration sensing means may be formed by a second gyroscope, by an angular accelerometer, by a flywheel or by at least two linear accelerometers.

The angular acceleration sensing means need not be a pure angular accelerometer, i.e. one inherently designed to give an output proportional to angular acceleration, but can be formed by other forms of angular sensor in combination with suitable electronic processing provided that such sensors have a sufficiently high bandwidth. The quality of rate measurements provided by the composite system in terms of rate measurement bias uncertainty, Scale Factor error and axis misalignment is largely determined by the primary gyroscope's inherent properties and is largely independent of the characteristics of the angular acceleration measurement means. A relatively simple sensor such as a suitably processed rate gyro of a lower grade than the primary gyro may therefore be used. When the primary gyroscope forms part of a larger system such as a Strapdown Navigation System or Autopilot it may be to arranged to use sensors already existing within the larger system to provide the necessary angular acceleration feed back.

BRIEF DESCRIPTION OF THE DRAWINGS

A system in accordance with the present invention is now described in detail with reference to the accompanying drawings, in which.

DESCRIPTION OF PREFERRED EXAMPLE

Figure 1:
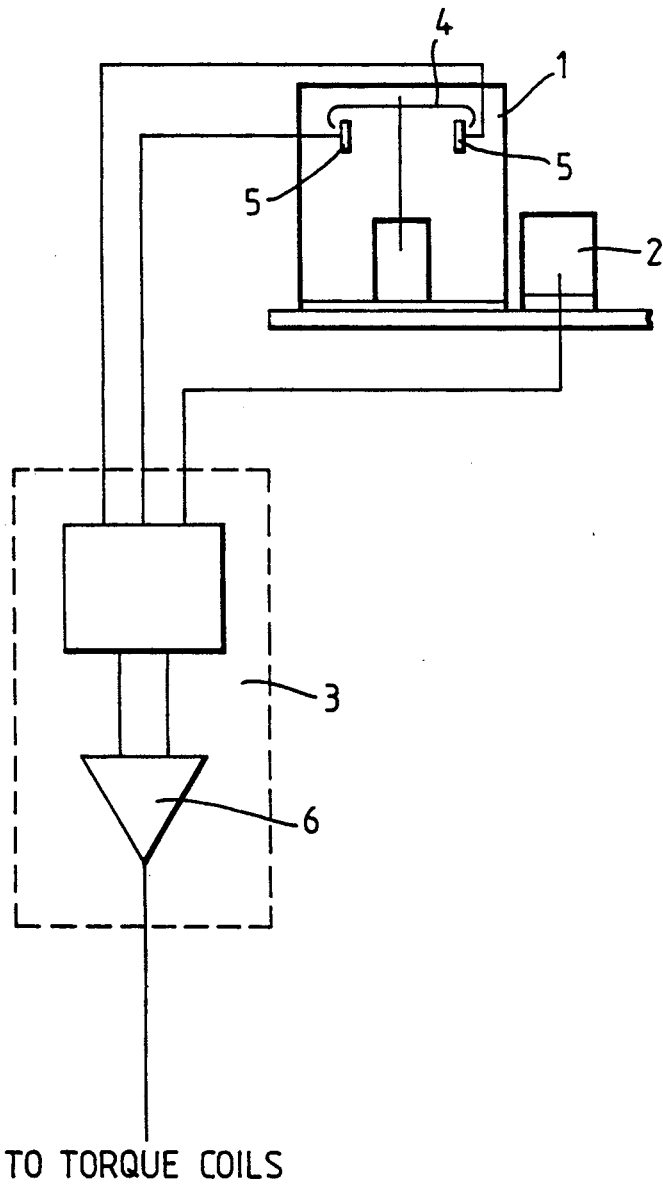
FIG. 1 is a diagram illustrating the present invention.

A gyroscopic system in accordance with the present invention comprises a dual axis rate gyroscope 1, an independent angular accelerometer 2 and a signal processing and torque amplifying control system 3. The gyroscope 1 includes a rotor 4 and pick-off coils 5. Magnetic elements towards the periphery of the rotor 4 induce currents in the pick-off coils 5 producing a signal dependent upon the angle of tilt of the rotor 4. Signals from the pick-off coils 5 are input to the control system 3. The control system 3 includes an amplifier 6 which outputs a signal which varies in accordance with the tilt of the rotor as sensed by the pick-up coils 5. This signal is transmitted to coils positioned adjacent the rotor 4 which produce a torque on the rotor 4 which tends to oppose the tilt of the rotor 4. In the particular embodiment shown the same coils 5 are used to provide the pick-off and the torque.

The angular accelerometer 2 provides an additional input to the control circuit 3 which is independent of the primary gyroscope 1. The resulting output signal from the control circuit 3 creates a torque to precess the gyroscope's rotor 4 in accordance with the environmental angular motion of the base to which both the gyroscope 1 and angular accelerometer 2 are attached. The output from the accelerometer 2 is employed as a control loop shaping term for the primary control loop for the gyroscope 1.

For clarity the system is shown applied to only one axis of the dual axis gyro in FIG. 1. In general the system would be replicated on the other axis, the exception being in those cases where the performance in only one axis needs enhancing.

Figure 2:
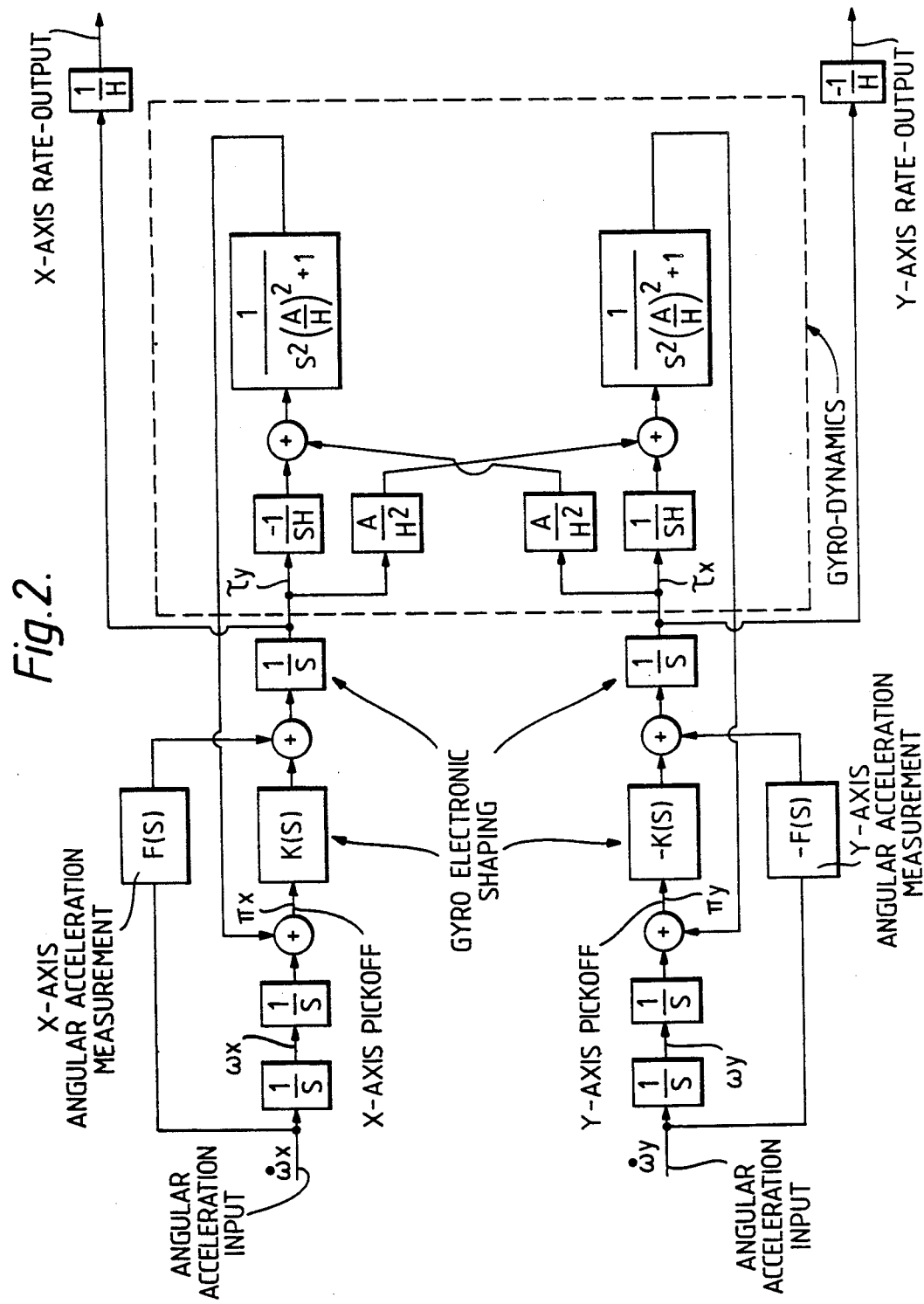
FIG. 2 is a block diagram showing the dynamics of a system in accordance with the present invention using Laplacian notation.

FIG. 2 illustrates the dynamics of the gyroscope 1 and its control system using Laplacian notation in which:

S = Laplace operator
A = moment of inertia of gyrorotor about diagonal
H = angular momentum of rotor
$\tau_x, \tau_y$ = torques applied to the gyro rotor about its x and y axes respectively
$\pi_x, \pi_y$ = angular pick-off angles about the gryo's x and y axes respectively
F(S) = transfer function between angular acceleration input and input to gyro loop
$K_1(S) \ K_2(S)$ = gyro loop shaping terms
$\omega_x, \omega_y$ = input angular acceleration about x and y axes F(S), the transfer function between the angular acceleration input to the angular acceleration sensor 2 and the output from the sensor 2 which provides the input to the gyro loop varies according to the nature of the sensor chosen. The sensor may be a pure angular accelerometer, a rate gyro or even a simple flywheel with suitable electronic signal shaping circuits. In each case the circuits providing the gyro loop shaping terms are chosen accordingly so that the combination of F(S) and $K_2(S)/S$ are such that when the "real world" angular acceleration signal is processed by F(S). $K_2(S)/S$ the input to the gyro torquer is proportional to the applied angular rate. In an ideal gyro with no internal errors the signal shaped by the combination $K_2(S)/S$ would torque the gyro so that it followed the input motion exactly thereby keeping the rotor off its stops. Under these ideal conditions the gyro control loop could be done away with altogether. Since in practice there is mechanical noise and other internal errors in the gyro system the gyro loop needs to be controlled as well. An electronic signal shaping is again used to give a gyro loop shaping term $K_1(S)$ chosen so that with the given $K_2(S)$ and $F_s$ the gyro loop as a whole is stable.

Although the invention has been described with reference to a particular form of dual axis rate gyroscope it is equally applicable to other types of rate gyroscope.

We claim:

1. A dual-axis rate gyroscope system comprising:
    a support platform;
    a rotor mounted for rotation relative to the support platform and for angular displacement relative thereto, said rotor having a rate of rotation;
    transducer means, coupled to the rotor, for forming a first electrical signal representative of said angular displacement of the rotor relative to the platform;
    torque applying means, coupled to the rotor and responsive to a torque signal, for precessing said rotor and for cancelling said angular displacement of said rotor for a range of values independent of said rate of rotation;
    angular acceleration sensing means, supported by said platform, for forming a second electrical signal representative of angular acceleration of the platform; and
    control loop means, connected to said transducer means, said angular acceleration sensing means and said torque applying means, for combining said first and second electrical signals forming said torque signal.

2. The system of claim 1, wherein said angular acceleration sensing means comprises a rate gyroscope and processing means, operatively connected to said rate gyroscope, for processing a signal from said rate gyroscope thereby producing said signal dependent on said sensed angular acceleration.

3. The system of claim 2, wherein said angular acceleration sensing means comprises part of a guidance system independent of said dual-axis rate gyroscope.

4. The system of claim 1, wherein said angular acceleration sensing means comprises two linear accelerometers and processing means, operatively connected to said two linear accelerometers, for processing, a signal from said two linear accelerometers thereby producing said output dependent on said sensed angular acceleration.

* * * * *